United States Patent
Igaki et al.

(10) Patent No.: US 6,361,572 B1
(45) Date of Patent: Mar. 26, 2002

(54) METHOD OF MAKING AN ELECTROLYTIC CAPACITOR HAVING A CONDUCTIVE POLYMER FORMED ON THE INNER SURFACE OF MICROPORES OF THE ANODES

(75) Inventors: Emiko Igaki, Amagasaki; Masakazu Tanahashi, Osaka; Chiharu Hayashi, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/616,876

(22) Filed: Jul. 14, 2000

Related U.S. Application Data

(62) Division of application No. 09/089,264, filed on Jun. 3, 1998, now Pat. No. 6,134,099.

(30) Foreign Application Priority Data

Jun. 3, 1997 (JP) ............................................. 9-145329

(51) Int. Cl.[7] .............................. H01G 9/00; H01G 9/02; H01G 9/04; B05D 5/12
(52) U.S. Cl. ...................... 29/25.03; 361/523; 361/525; 361/532; 427/80
(58) Field of Search ............................ 29/25.01–25.03; 381/523–525; 427/79, 80

(56) References Cited

U.S. PATENT DOCUMENTS

| | | | |
|---|---|---|---|
| 4,697,001 A | 9/1987 | Walker et al. | 528/423 |
| 4,740,869 A | 4/1988 | Morimoto et al. | 361/433 |
| 5,119,274 A | 6/1992 | Kinuta et al. | 361/525 |
| 5,189,770 A | 3/1993 | Waidhas et al. | 29/25.03 |
| 5,442,197 A | 8/1995 | Andrieu et al. | 257/40 |
| 5,457,862 A | 10/1995 | Sakata et al. | 29/25.03 |
| 5,464,453 A * | 11/1995 | Tong et al. | 29/25.03 |
| 5,473,503 A | 12/1995 | Sakata et al. | 361/525 |
| 5,538,813 A | 7/1996 | Li | 429/192 |
| 5,586,001 A | 12/1996 | Amano et al. | 361/525 |
| 5,626,729 A | 5/1997 | Thompson et al. | 204/252 |
| 5,914,852 A * | 6/1999 | Hatanaka et al. | 361/523 |

FOREIGN PATENT DOCUMENTS

| | | |
|---|---|---|
| JP | 2-224316 | 9/1990 |
| JP | 4-87317 | 3/1992 |
| JP | 6-77093 | 3/1994 |
| JP | 6-271655 | 9/1994 |
| JP | 7-201676 | 8/1995 |

* cited by examiner

*Primary Examiner*—Ha Tran Nguyen
(74) *Attorney, Agent, or Firm*—Wenderoth, Lind & Ponack, L.L.P.

(57) ABSTRACT

Disclosed is a method of making an electrolytic capacitor including the steps of forming a cathode by depositing a homogeneous and densified conducting polymer on a dielectric layer of a valvular metal porous anode. The conducting polymer is formed of two layers by chemical oxidation polymerization. The first conductive polymer layer is formed in the pretreatment step using a solution excluding an organic acid-type dopant, the polymer is efficiently formed on the inner surface of the pores of the anode and the second conductive polymer layer is formed in the primary treatment step on the first conductive polymer layer, using a solution containing an organic acid-type dopant. The resultant capacitor obtains a high capacitance, a low impedance, and a high responsiveness at high frequencies.

21 Claims, 7 Drawing Sheets

METHOD OF MAKING AN ELECTROLYTIC CAPACITOR HAVING A CONDUCTIVE POLYMER FORMED ON THE INNER SURFACE OF MICROPORES OF THE ANODES

CROSS REFERENCE TO RELATED APPLICATION

This application is a divisional application of Ser. No. 09/089,264 filed June 3, 1998, now U.S. Pat. No. 6,134,099.

BACKGROUND OF THE INVENTION

1. Field of the Invention

The present invention relates to an electrolytic capacitor using a valvular metal such as aluminum, tantalum, or the like, to a method for producing the electrolytic capacitor, and, particularly, to an electrolytic capacitor using an conducting polymer as the cathode and its production method.

2. Description of the Prior Art

Customary electrolytic capacitors using a valvular metal e.g. aluminum, tantalum, are generally fabricated using a valvular metal porous body as the anode, an oxide of a valvular metal as the dielectric layer, and an liquid electrolyte or an inorganic solid electrolyte as the cathode. As the cathode, for example, an organic solvent including an organic acid or the like is used in an aluminum electrolytic capacitor and manganese dioxide or the like in a tantalum electrolytic capacitor. In addition to the above, lead portions connecting to the anode and the cathode and finally a casing are formed.

Excellent responsiveness at high frequencies has been demanded of electronic parts along with the digitization of circuits. It is therefore required for the electrolytic capacitor to be improved in the excellent responsiveness at high frequencies by a reduction in the resistance. In this situation, the use of a high conducting polymer as a cathode has been studied and developed.

The conducting polymers used for conventional electrolytic capacitors are produced by polymerizing corresponding monomers by an electrolytic oxidation polymerization method or a electrochemical oxidation polymerization method. In these conducting polymers, a dopant anion is coordinated to improve the electronic conductivity. The doping with the dopant is usually performed in a solution in which the dopant coexists with monomers when the monomer is polymerized.

As the dopant, various anions such as a chlorine ion, sulfuric ion, and organic acid ion are utilized. The organic acid-type anions having a molecular structure with a large steric hindrance to the free movement of the organic anion in a polymer are industrially used to restrain the dedoping of the dopant from the formed conducting polymer layer.

The electrolytic capacitor has the structural feature in which an oxide film is formed on the surface of a porous valvular metal and the surface of pores of the valvular metal and is used as a dielectric layer, and the valvular metal remaining inside the dielectric layer is used as a anode. When forming a cathode in the capacitor, it is therefore necessary to coat, with the conducting polymer, the entire surface of the valvular metal, specifically, extending from the open surface of the porous body to the surface of very intricate internal pores in an efficient manner. In the case of producing the conducting polymer layer by the electrochemically oxidizing polymerization method, though the conducting polymer is formed into a densified coating with a low resistance and high quality, only an insufficient coating of the conducting polymer is formed in the inside of the porous body, posing the problem that no original capacitance is created due to imperfect coating.

On the other hand, formation of the conducting polymer by the chemical oxidation polymerization method results in that a coating of the conducting polymer is entirely formed even on the surface of internal of the porous body with ease. The polymer, however, is basically formed as precipitates exhibiting poor density and adhesion to a dielectric layer as described in U.S. Pat. No. 4,697,001. Thus this method gives rise to the problem that no uniform conducting polymer layer with a sufficiently low resistance can be obtained in a stable manner.

SUMMARY OF THE INVENTION

An object of the present invention is to provide an electrolytic capacitor in which an conducting polymer layer can be efficiently formed even on the inner surfaces of micropores in a porous body constituting a anode to coat a dielectric layer perfectly with the polymer layer, thereby inducing the original capacitance in an oxidation polymerization method, and also to provide a method for producing such a electrolytic capacitor.

A further object of the present invention is to provide an electrolytic capacitor in which an conducting polymer layer is formed as a densified layer which is highly adhesive to a dielectric layer formed in a porous body and which can be used as a stable cathode with a low resistance and also to provide a method for producing the electrolytic capacitor.

The above objects of the present invention can be attained by the provision of an electrolytic capacitor comprising a anode formed of a valvular metal porous body, a dielectric layer formed of an oxide of the valvular metal, and a cathode formed of an conducting polymer layer, wherein the conducting polymer layer is an polymer layer containing an organic acid-type dopant and formed by processing the monomer by chemical oxidation polymerization in a solution and the conducting polymer layer is formed as a uniform coating on the surface of the dielectric layer in the porous body.

Illustrating in more detail, the conducting polymer layer forming the cathode in the electrolytic capacitor of the present invention comprises an conducting polymer layer which contains no organic acid-type dopant, and is formed as a lower film on the dielectric layer and an conducting polymer layer which contains an organic acid-type dopant as a upper film which is formed on the above conducting polymer layer.

The conducting polymer layer containing no organic acid-type dopant, which is formed by chemical oxidation polymerization method, is formed extending to the inside of pores of the porous body. This is one of the features of the chemical oxidation polymerization method. Because the organic acid-type dopant, which also acts as a surfactant, is not present, this conducting polymer layer has a excellent advantage in that it is highly adhesive to the dielectric layer and is produced in the form of film. Therefore the internal pores can be efficiently coated with the densified conducting polymer layer which is highly adhesive to the dielectric layer and extends from the surface of the porous body to the surface of internal pores.

On the other hand, generally the conducting polymer layer containing the organic acid-type dopant is to be produced as particulate precipitates, but it is experimentally confirmed that the conducting polymer layer containing the organic acid-type dopant grows as a densified film on the conducting polymer layer without containing an organic acid-type dopant which have formed. Accordingly, the above conducting polymer layer without containing an organic acid-type dopant is formed in advance whereby the conducting polymer layer containing organic acid-type dopant can be formed as a densified and filmed polymer layer and can have high conductivity.

An entire conducting polymer layer is formed as a layer, which may be increased in rate of covering the dielectric layer and decreased in resistance, which enables the capacitor have high capacitance and high responsiveness at high frequencies.

In order to provide the above electrolytic capacitor, when forming an conducting polymer layer by a chemical oxidation polymerization method, the production method of the electrolytic capacitor in the present invention comprises, in a pretreatment, a step of forming a film of an conducting polymer layer without containing an organic acid-type dopant on the surface of a dielectric layer formed of an oxide, and, as a primary treatment, a step of growing an conducting polymer layer containing an organic acid-type dopant on said lyer.

In the pretreatment of the above process, a porous body of a valvular metal formed with a dielectric layer is dipped into a solution containing a monomer and an oxidizing agent but not containing an organic acid-type dopant to form an conducting polymer layer without containing an organic acid-type dopant on surface on the dielectric layer by polymerizing the monomer.

Alternatively, in the pretreatment of the process, a valvular metal porous body formed with a dielectric layer is dipped alternately in a monomer solution and in a oxidizing agent solution neither of which contains an organic acid-type dopant to form an conducting polymer layer without containing an organic acid-type dopant on the surface of the dielectric layer by polymerize the monomer.

Next, in the primary treatment, the valvular metal porous body formed with the conducting polymer layer in the pretreatment may be dipped in a solution containing a monomer, an oxidizing agent, and an organic acid-type dopant to form an conducting polymer layer containing an organic acid-type dopant on the surface of the conducting polymer layer by polymerizing the monomer. In another primary treatment, the valvular metal porous body formed with the conducting polymer layer in the pretreatment may be dipped alternately in a monomer solution and oxidizing agent solution, at least either of which contains an organic acid-type dopant, to form an conducting polymer layer containing an organic acid-type dopant on the surface of the conducting polymer layer by a polymerization reaction.

In this method, first as the pretreatment chemical oxidation polymerization reaction of a monomer is performed in the solution include no organic acid-type dopant whereby the conducting polymer layer excluding the organic acid-type dopant can be formed on the surface of the dielectric layer as a densified film which is highly adhesive to the dielectric layer. Next, as the primary treatment, the polymerization reaction of the monomer is performed in a solution containing an organic acid-type dopant whereby the conducting polymer layer containing the organic acid-type dopant can grow as a film over the surface of the conducting polymer layer without containing an organic acid-type dopant. As a consequence, the conducting polymer layer formed as a film which is highly adhesive to the dielectric layer is used as the cathode which makes it possible to manufacture a capacitor achieving a high rate of the capacitance relative to the ideal capacitance to be calculable from the porous structure, and having lower resistance, and excellent responsiveness at high frequencies.

BRIEF DESCRIPTION OF THE DRAWINGS

In the accompanying drawings, there are shown illustrative embodiments of the invention from which these other of its objectives, novel features, and advantages will be readily apparent.

In the drawings.

DETAILED DESCRIPTION OF THE INVENTION AND PREFERRED EMBODIMENTS

The present invention will now be explained in detail.

In an electrolytic capacitor according to the present invention, an anode is formed of a valvular metal porous body which is preferably made of aluminum or tantalum. The valvular metal porous body is formed with a great number of fine pores passing each another to the external surface.

Examples of the anode include aluminum materials laminated by surface-etched aluminum foils, thereby forming a great number of micro-pores, and porous bodies produced by winding said aluminum foil and tantalum materials produced by compressing/forming a tantalum powder followed by sintering to form a porous body with a desired shape.

The dielectric layer makes use of a thin-coated metal oxide layer formed on the surface of the valvular metal by anode oxidation. The dielectric layer is also produced on the surfaces of a great number of fine pores formed in the porous body. The cathode makes use of a conducting polymer material, specifically, in a form of polymer layer with which the pores of the porous body are impregnated.

Figure 1A:
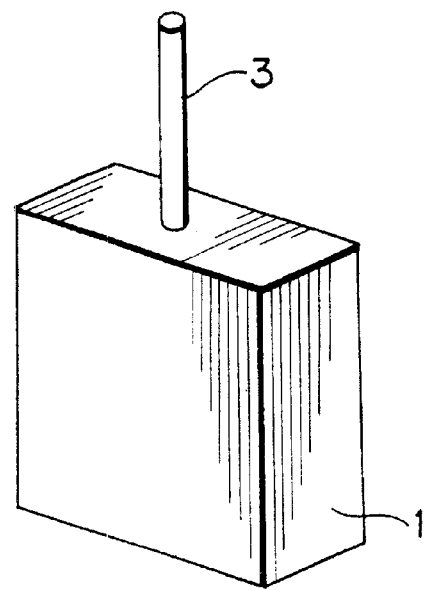
FIG. 1A is a typically perspective view showing a porous body as an electrolytic capacitor according to an embodiment of the present invention.
Figure 1B:
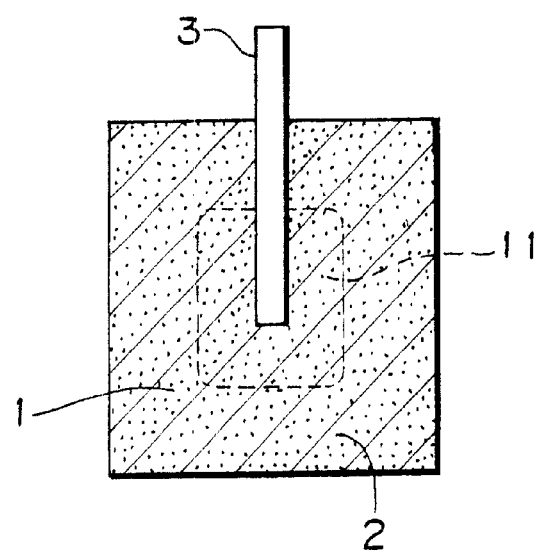
FIG. 1B is a sectional view of the electrolytic capacitor corresponding to the embodiment of the present invention.

FIGS. 1A and 1B show an anode porous body 1 for an electrolytic capacitor formed with a anode making use of a sintered body 1 produced by compressing a tantalum powder into a material of rectangular parallelepiped and then firing as the porous body. In this embodiment, an anode lead 3 is integrated with and projects from the porous body 1 (see FIG. 1(B)).

In the present invention, the conducting polymer layer 2 is filmed over the dielectric layer produced on a great number of micropores inside the porous body 1.

Figure 2A:
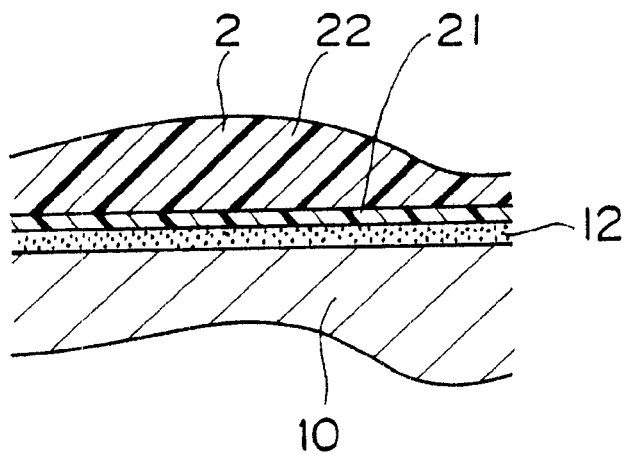
FIG. 2A is an enlarged typical view showing the inside microstructure of the anode porous body of the electrolytic capacitor illustrated in FIG. 2A.
Figure 2B:
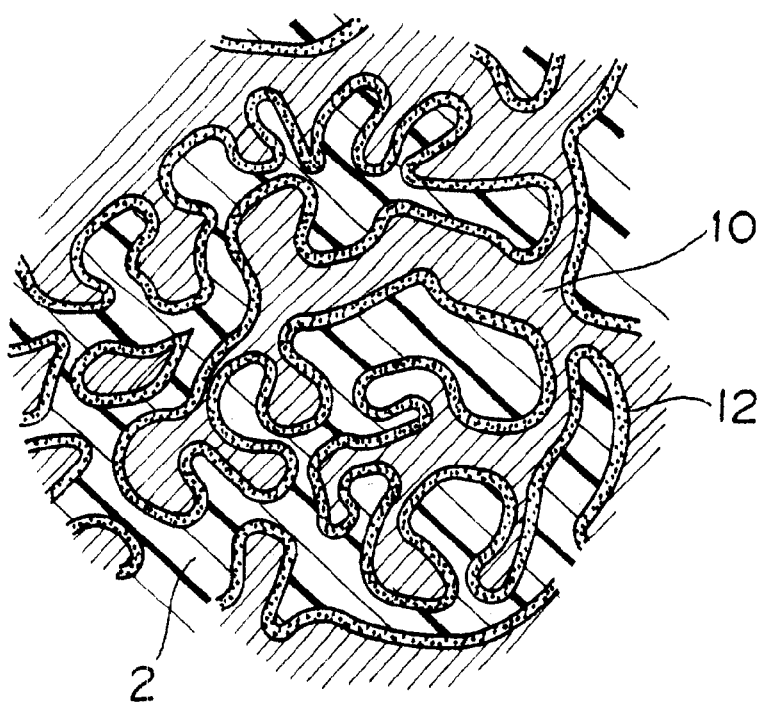
FIG. 2B is a view showing a microstructure of the inside of an anode porous body of an electrolytic capacitor in the present invention.

FIGS. 2A and 2B show a conceptive microstructure of the tantalum porous body of the above electrolytic capacitor. The pores of the sintered tantalum metal 10 (anode 10) is filled with an conducting polymer layer 2, which is intimately combined with a thin dielectric layer 12 on the surface of pores. FIG. 2A shows a conceptive structure of the conducting polymer layer 2 consisting of a lower polymer layer 21, combined with the thin dielectric layer 12 on the flat surface of the tantalum metal 10, and an upper polymer layer 22 which is grown and formed on the lower layer.

The lower polymer layer 21 is the conducting polymer layer without containing an organic acid-type dopant which is formed in the pretreatment. The upper polymer layer 22 is the conducting polymer layer containing an organic acid-type dopant. The boundary between the two polymer layers 21 and 22 is not so clear.

As the conducting polymer, preferably an conducting polymer of a heterocyclic five-membered ring compound or of its derivative is utilized. Examples of such a heterocyclic five-membered ring polymer which can be used as the conducting polymer include polymers of pyrrole, thiophene, 3-alkylthiophene, or isocyanaphthene. A six-membered ring compound or its derivative may also be used as conducting polymers, and examples of these polymers include polyparaphenylene, polyaniline and polyparaphenylenevinylene.

In the production of polymers of pyrrole, pyrrole is polymerized by a chemical oxidation polymerization method. In this polymerization method, a monomer such as pyrrole is reacted with an oxidizing agent to produce the conducting polymer. As the oxidizing agent, hydrogen peroxide, peroxides of other compounds, as well as metal ions such as trivalent iron ions may be preferably used.

In order to increase the electroconductivity of the conducting polymer layer, doping using a dopant is adopted. As the dopant, various anions such as a chlorine ion, sulfuric acid ion, or the like are utilized. These ions are used in combinations of these as the case may be. Organic acid-type anions having a molecular structure with a large steric hindrance resisting the free movement thereof in the polymer are used to restrain the dedoping of the dopant from the formed conducting polymer layer. For the above conducting polymer, preferably arylsulfonic acid ions such as an alkylnaphthalenesuofonic acid ion or arylphosphoric acid ions can be utilized.

In the production of the conducting polymer layer, the valvular metal porous body formed with the dielectric layer is dipped and maintained in a solution containing a monomer which will be converted into the conducting polymer, and an oxidizing agent for promoting polymerizing the monomer. The monomer is polymerized by the aid of the oxidizing agent whereby an conducting polymer is formed in contact with the dielectric layer on the surface inside the micropores in the valvular metal porous body.

In the formation of the conducting polymer layer according to the present invention, it is of importance that the polymerization for the conducting polymer layer formed directly on the dielectric layer is performed in a solution without containing an organic acid-type dopant in the pretreatment. By this measures, the polymer layer without containing an organic acid-type dopant is obtained as a densified and uniform film adhering to the dielectric layer. The conducting polymer layer is also formed sufficiently on the entire surface of the dielectric layer extending from the surface of the porous body to the inside of pores due to the chemical oxidation polymerization method. Here, a dopant other than the organic acid-type dopant, such as an inorganic dopant, may be utilized and be contained in the solution used in the pretreatment. The inorganic acid is stable in the solution and can not adhere to the surface of the oxide dielectric layer, and hence it never decreases the adhesion between the conducting polymer layer and the dielectric layer.

Alternatively, in the pretreatment, the valvular metal porous body formed with the dielectric layer may be dipped alternately in a monomer solution and in an oxidizing agent solution, the both solutions without containing an organic acid-type dopant. When the valvular metal porous body is dipped and maintained in the solutions alternately, the monomer is polymerized thereby forming, as a densified and highly adhesive film, an conducting polymer layer without organic acid-type dopant on the dielectric layer of the valvular metal porous body.

In the primary treatment for producing the conducting polymer layer, the valvular metal porous body treated in the pretreatment is dipped in a solution containing a monomer and an oxidizing agent to which an organic acid-type dopant is further added to form a new polymer layer doped with the dopant on the above polymer layer without organic acid-type dopant. This polymer layer containing the organic acid-type dopant can grow on the lower polymer layer as a densified layer insofar as the reaction rate is not so high. Thus, the polymer layer containing the dopant is also formed as a densified film and the electroconductivity of the polymer layer containing the dopant can be more improved due to the densified film thereby attaining a reduction in resistance of the entire conducting polymer layer.

Alternatively, in the primary treatment, the valvular metal porous body is dipped alternately in a solution containing a monomer and in another solution containing an oxidizing agent, at least one of the solutions containing an organic acid-type dopant. On the conducting polymer layer without containing an organic acid-type dopant is further formed the conducting polymer layer containing an organic acid-type dopant by a polymerization reaction thereby forming an conducting polymer layer.

As the organic acid-type dopant acts as a surfactant, the monomer solution in which the porous body is dipped, can easily penetrate into the inside of pores of the valvular metal porous body, causing the conducting polymer layer to extend even deep into pores.

However, the pretreatment solution dose not contain a surfactant due to the organic acid-type dopant, so that it decreases in penetrability into the micropores in the vicinity of the core of the porous body. This makes it difficult to form an conducting polymer without containing an organic acid-type dopant on the entire dielectric coating extending deep into pores.

In order to avoid this drawback the following methods can be adopted:

In a first method, after the valvular metal porous body is dipped in the mixed solution of the monomer and the oxidizing agent or in the first solution among the two solutions alternately used, the pressure in the system involving the solution is reduced to impregnate uniformly, with the solution, any portions of the valvular metal porous body extending even to every portions of the inside of pores.

Another method may be adopted in which the dielectric coating of the valvular metal porous body is moistened by vapor of a solvent used in the aforementioned solution or solvent vapor having affinity or compatibility with the aforementioned solution. This ensures that affinity of the solution to the dielectric coating is improved and the solution thereby readily penetrates so deep into the pores as to form an conducting polymer coating film with high density and high adhesion to the dielectric layer on the entire surface of the body. Water can be adopted as the solvent when the reacting solution system is aqueous. When the porous body is impregnated with the solution containing a monomer, various organic solvents may be used because of an excellent affinity for the monomer. A method of moisturizing using monomer vapor, when occasion demands, may be used.

Prior to the primary treatment, the porous body treated in the pretreatment may be dipped in a solution containing an organic acid-type dopant to dope the conducting polymer layer excluding any organic acid-type dopant with the organic acid-type dopant. Specifically, in the next primary treatment, an new conducting polymer layer containing the organic acid-type dopant can be again formed on said conducting polymer layer doped with the organic acid-type dopant in aforesaid manner. Since the conducting polymer layer which has been formed as a densified film is doped with the organic acid-type dopant, the electroconductivity of the lowest conducting polymer layer can be increased thereby more reducing the entire resistance of the conducting polymer layer.

As the dopant solution used when the re-doping with the organic acid-type dopant is performed prior to the primary treatment, it is preferred to be a solution containing a solvent capable of moistening the conducting polymer layer. The solution may, for example, contain alcohol or the like.

Figure 3:
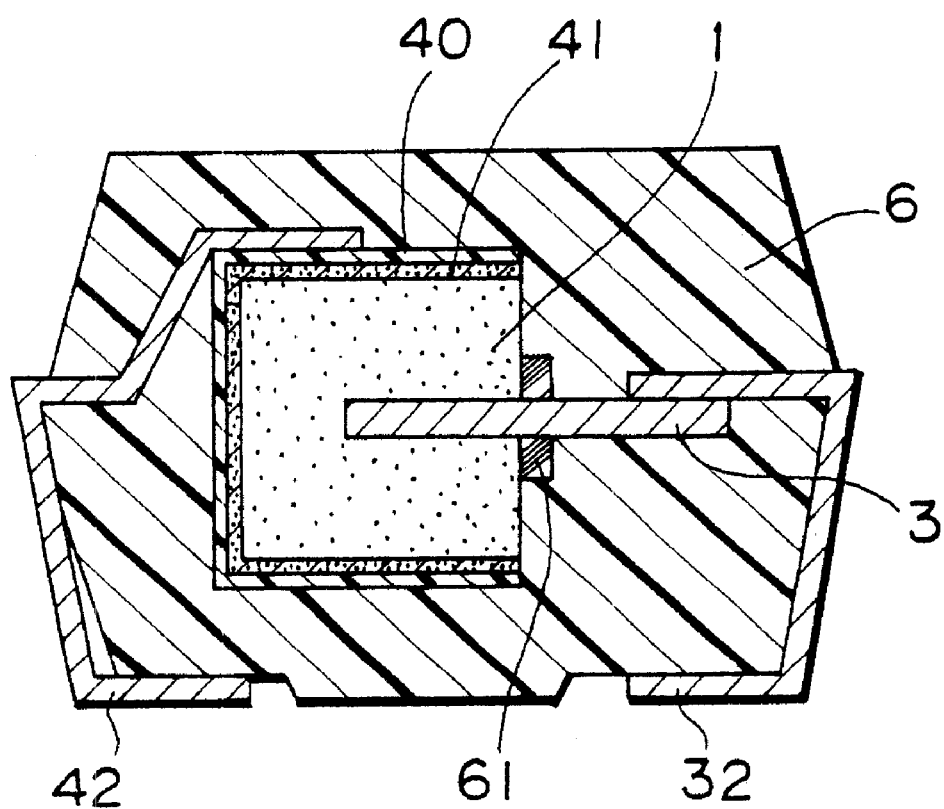
FIG. 3 is a sectional view of an electrolytic capacitor to be packaged corresponding to the embodiment of the present invention.

The electrolytic capacitor produced in this manner is, as shown in FIG. 3, further coated with an conducting carbon layer 41 and an conducting silver paste layer 40 around a periphery of the porous body 1, both of which are conductive layers. In an embodiment for packaging, wire electrodes 32, 42 are connected to an anode lead 3 and the cathode silver paste layer 40 respectively. Then all parts are molded with an insulating resin to produce an electrolytic capacitor, which will be mounted on wiring boards.

EXAMPLES

The present invention will be explained in more detail by way of examples, which are not intended to be limiting of the present invention.

Example 1

A test was made for making a conducting polymer layer formed as a coating film which was highly adhesive to an oxide layer. In this example, polypyrrole was used as the conducting polymer and an alkylnaphthalenesulfonic acid ion as a organic acid-type dopant.

The dielectric oxide coating layer was artificially replaced with a glass substrate which the same metal oxide to carry out the test.

The monomer solution was produced by dissolving pyrrole as a monomer used for forming polypyrrole, in an aqueous solution containing 10% by volume of isopropyl alcohol in such a manner that the amount of pyrrole was 0.1 mol/l.

The oxidizing agent solution was produced by dissolving iron sulfate (III) as the oxidizing agent and a Na salt with an alkylnaphthalenesulfonic acid ion as the organic acid-type dopant in an aqueous solution containing 10% by volume of isopropyl alcohol in such a manner that the amounts of the oxidizing agent and the Na salt were 0.1 mol/l and 0.05 mol/l respectively. This solution was designated as oxidizing agent solution 1.

In addition, iron sulfate (III) was dissolved in an aqueous solution containing 10% by volume of isopropyl alcohol in such a manner that the amount of iron sulfate was 0.1 mol/l to prepare an oxidizing agent solution 2 excluding the organic acid-type dopant (including a sulfuric acid ion).

Figure 7:
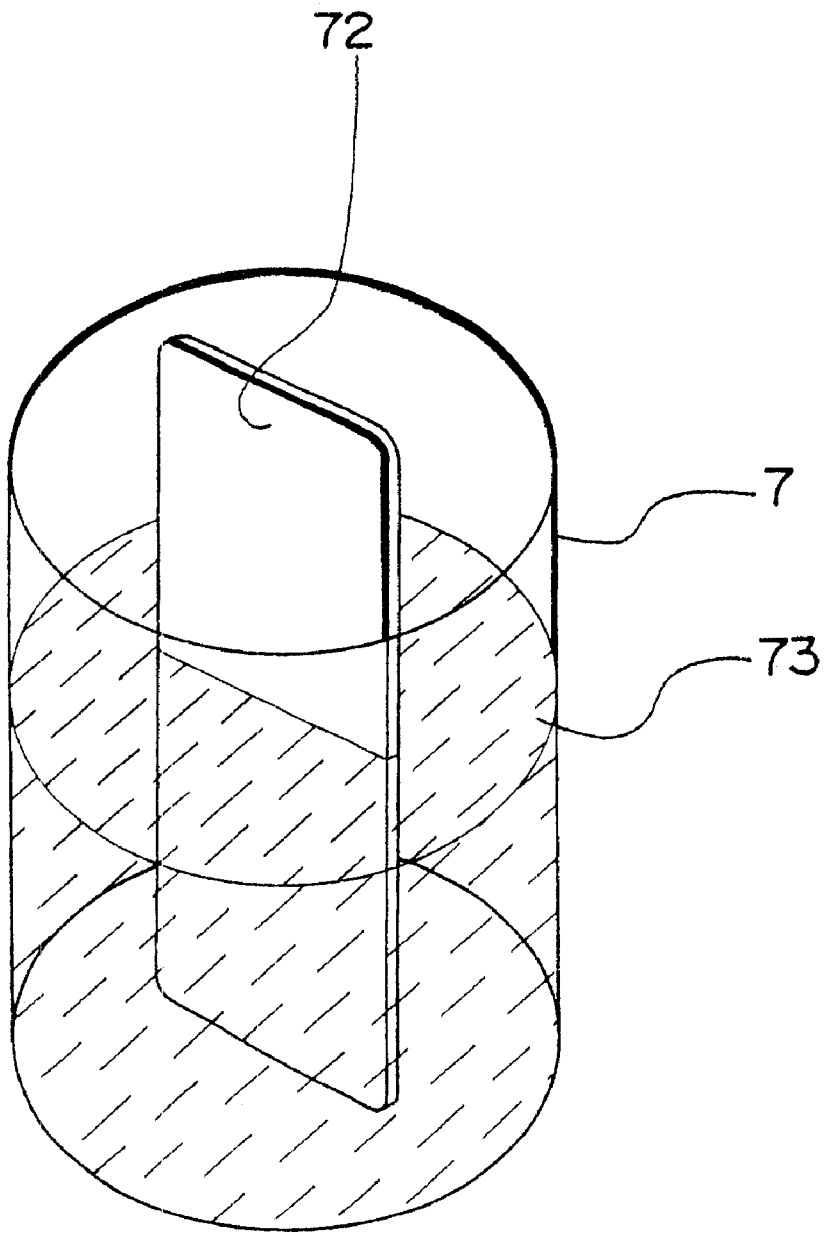

As shown in FIG. 7, in the test, a slide glass plate 72 was dipped in a solution 73 containing the monomer in a container 7, to form an conducting polymer layer on the surface of the glass plate 72 in each condition of chemical oxidation polymerization and to observe the outward appearance of the slide glass plate 72.

Test (1) was made by mixing the monomer solution and the oxidizing agent solution 1 and dipping the slide glass plate in the mixed solution for one hour.

Test (2) was made by mixing the monomer solution and the oxidizing agent solution 2 and dipping the slide glass plate in the mixed solution for one hour. This test corresponded to the pretreatment of the present invention.

Test (3) was made by mixing the monomer solution and the oxidizing agent solution 2 and dipping the slide glass plate in the mixed solution for 10 minutes. This test corresponded to the pretreatment of the present invention.

Test (4) was made by blending the monomer solution and the oxidizing agent solution 2 and dipping the slide glass plate in the mixed solution for 10 minutes as the pretreatment and then by dipping the treated glass plate for one hour in a solution prepared by blending the monomer solution and the oxidizing agent solution 1 as the primary treatment.

The following results was confirmed from the observation of the glass plate: In the case of using the solution containing the organic acid-type dopant as shown in Test (1), an conducting polymer was produced by polymerization in the solution but was deposited on the bottom of the container. Also, the conducting polymer layer attached but not adhered to the glass plate, showing that no coating was formed on the glass plate.

On the other hand, in the case of using the solution without containing an organic acid-type dopant as shown in Test (2), a conducting polymer layer was as a film formed on the glass plate. It was therefore confirmed that the monomer is polymerized by chemical oxidation in the solution without containing an organic acid-type dopant whereby the resulting conducting polymer can be formed on the glass plate as a film which is highly adhesive to the glass plate.

When the glass plate was treated in the solution excluding an organic acid-type dopant for 10 minutes as shown in Test (3), formation of a thin film of an conducting polymer layer was confirmed. In Test (4), the primary treatment was carried out in the solution containing the organic acid-type dopant. It was also confirmed that, as shown in Test (4), as the conducting polymer layer without containing an organic acid-type dopant was formed in advance on the glass plate in the same manner as in Test (3), the primary treatment performed in the solution containing the organic acid-type dopant enables the conducting polymer layer to grow further, thereby forming a thick film.

The film thickness and electroconductivity of each of the conducting polymer layers formed in the above tests are shown in Table 1.

TABLE 1

| Test No. | Film thickness (nm) | Electro-conductivity (S/cm) | conductivity (S/cm) when adopting a doping process |
|---|---|---|---|
| (1) | Measurement impossible | Measurement impossible | — |
| (2) | 120 | 3.2 | 18 |
| (3) | 20 | No measurement | — |
| (4) | 200 | 32 | 36 |

As shown in Table 1, in the case of forming an conducting polymer layer in a solution without containing an organic acid-type dopant in the pretreatment and then a further conducting polymer layer in a solution containing an organic acid-type dopant in the primary treatment as shown in Test (4), high electroconductivity was obtained. Specifically, the electroconductivity of the sample obtained in Test (4) was one digit larger than that of the sample obtained in test (2) in which an conducting polymer layer was formed only in a solution without containing an organic acid-type dopant. In the samples obtained by performing polymerization reaction in a solution containing an organic acid-type dopant from the beginning, in turn, no conducting polymer was formed as a film and so measurement of the electroconductivity was impossible. Next, the doping effect into the conducting polymer film prepared in the pretreatment was confirmed experimentally.

A dopant solution was produced by dissolving sulfuric acid and a Na salt with an alkylnaphthalenesulfonic acid ion as the organic acid-type dopant in a solution containing 10% by volume of isopropyl alcohol in such a manner that the amounts of sulfuric acid and the Na salt were 0.05 mol/l and 0.05 mol/l respectively.

First, the glass plate used in Test (2) on which an conducting polymer film was formed was dipped in the above dopant solution for one hour. The glass plate prepared in Test (4) on which an conducting polymer film was formed in the pretreatment (by treating in a solution excluding an organic acid-type dopant for 10 minutes) was dipped in the above dopant solution for 30 minutes similarly and then in a solution produced by mixing the monomer solution and the oxidizing agent solution 1 for further one hour.

Each electroconductivity of the samples is shown in Table 1. The dipping in the dopant solution had no effect on the appearances of these glass plates prepared in Tests (2) and (4) treated in this manner. The films formed had high adhesion to the glass plates. It was also clarified that the electroconductivities of the conducting polymer layers formed on the glass plates prepared in Tests (2) and (4) were both improved.

It is confirmed from this example that the conducting polymer layer obtained by chemical oxidation polymerization in a solution containing an organic acid-type dopant has poor adhesion to the smooth surface of the glass plate and hence no film is formed on the glass plate, whereas the conducting polymer layer obtained by chemical oxidation polymerization in a solution excluding an organic acid-type dopant has high adhesion to the smooth surface of the glass plate and hence a certain film is formed on the surface of the glass plate. In the case of forming a thin conducting polymer layer in a solution excluding an organic acid-type dopant and then forming an conducting polymer layer in a solution containing an organic acid-type dopant, a new film grows over the film previously produced. The present invention thus makes it possible to form a low resistant conducting polymer layer containing an organic acid-type dopant as a thick film.

In the case of forming in advance a thin conducting polymer layer in a solution without containing an organic acid-type dopant, performing doping treatment in a dopant solution, and then forming an conducting polymer layer in a solution containing an organic acid-type dopant, it is clarified that the electroconductivity of the film previously produced can be improved and a new film with low resistance is allowed to grow over a highly conducting film. The formation of a low resistant conducting polymer layer is therefore allowed.

This example shows an instance using pyrrole as the monomer. The same phenomenon as in the case of using pyrrole was observed in the case of using thiophene. This clearly shows that a heterocyclic five-membered ring compound or its derivative have the same effect. Also, the same phenomena were observed in the case of using six-membered ring compounds and their derivatives such as polyaniline and polyparaphenylene.

Also, though in this example, a Na salt of alkylnaphthalenesulfonic acid is added as the organic acid dopant, other ions, for example, an arylsulfonic acid ion or an arylphosphoric acid ion had the same effect.

Example 2

Figure 4:
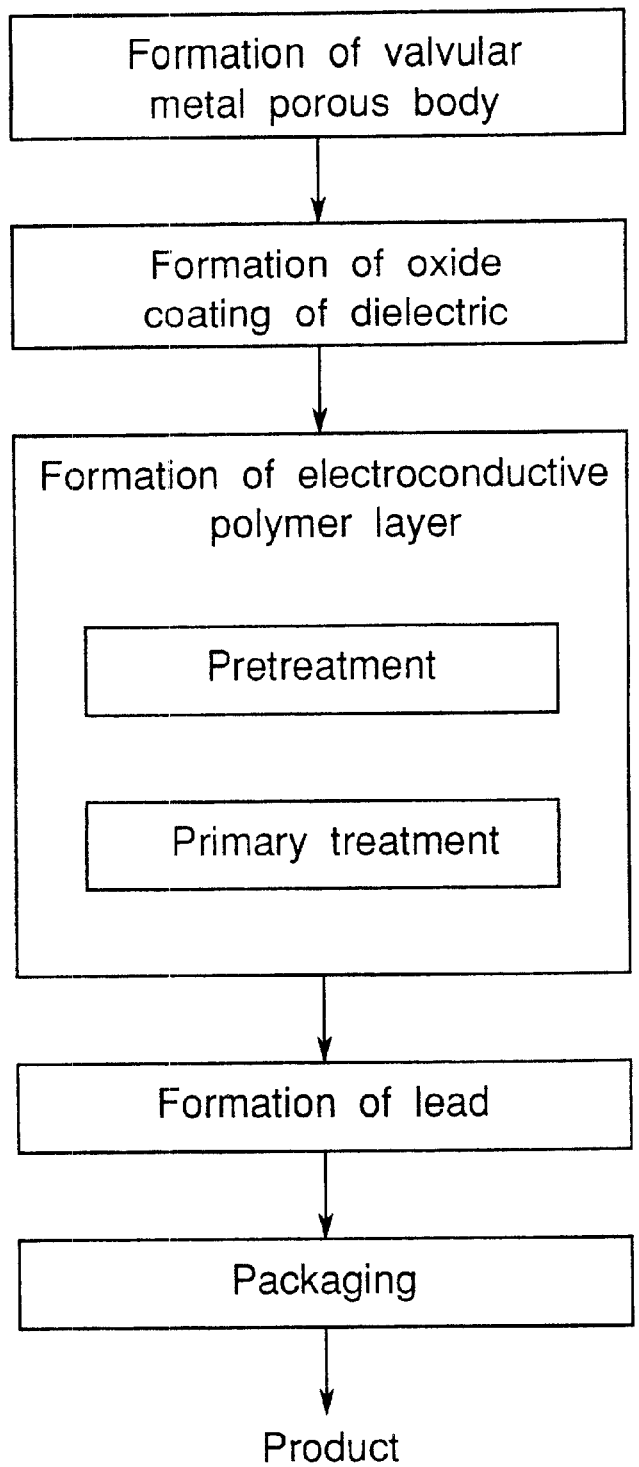
FIG. 4 is a schematic diagram illustrating a production method of an electrolytic capacitor in an example of the present invention.

FIG. 4 illustrates the production method of the electrolytic capacitor of the present invention.

In this example, tantalum was used as the valvular metal

A tantalum powder together with a lead was molded and baked to form a porous body with a size of 1.4 mm×3.0 mm×3.8 mm. Then, the surface of the body and inner surface of the pores were processed by chemical conversion treatment in an aqueous phosphoric acid solution at a voltage of 30 V to form an oxide coating dielectric layer thereby producing a capacitor element.

A conducting polymer layer was formed on the dielectric layer of the prepared capacitor element by the chemical oxidation polymerization illustrated below to form a cathode. A lead plate used as a collector for the cathode was externally disposed to make an electrolytic capacitor. The capacitance and impedance of the electrolytic capacitor were measured.

In the formation of an conducting polymer, pyrrole was dissolved in an aqueous solution containing 10% by volume of isopropyl alcohol in such a manner that the amount of pyrrole was 0.1 mol/l to form a monomer solution. An oxidizing agent solution 1 was produced by dissolving iron sulfate (III) as the oxidizing agent and a Na salt with alkylnaphthalenesulfonic acid ion as the organic acid-type dopant in a solution containing 10% by volume of isopropyl alcohol in such a manner that the amounts of iron sulfate and Na salt were 0.1 mol/l and 0.05 mol/l respectively. An oxidizing agent solution 2 which did not contain an organic acid-type dopant (but contains a sulfuric acid ion) was produced by dissolving iron sulfate (III) as the oxidizing agent in a solution containing 10% by volume of isopropyl alcohol in such a manner that the amount of iron sulfate was 0.1 mol/l.

(1) The monomer solution and the oxidizing agent solution 2 were mixed and the above capacitor element was dipped in the mixed solution to form an conducting polymer layer without containing an organic acid-type dopant on the dielectric layer produced in the inside surface of pores and surface of the capacitor element. Here, the dipping time was varied to form a product (a) with the thickness of the conducting polymer layer being 500 nm which was measured at the surface of the element and 100 nm which was an average of entire films including those of pores formed within the element and a product (b) with the thickness of the conducting polymer layer being 750 nm which was measured at the surface of the element and 150 nm which was an average of entire films. The products (a) and (b) were dipped alternately in the monomer solution and in the oxidizing agent solution 1 and this dipping operation was repeated 20 times to grow an conducting polymer layer containing an organic acid-type dopant over the conducting polymer layer without containing an organic acid-type dopant. In the alternate dipping repetition, a sequential operation, in which first the capacitor element was dipped in the monomer solution and then pulled up, and after that it was dipped and maintained in the oxidizing agent solution 1 to carry out a polymerization reaction, followed by washing and drying, was repeated.

(2) For comparison, a capacitor (c) was produced by the following conventional method: An operation in which the capacitor element was dipped alternately in the monomer solution and in the oxidizing agent solution 1 was repeated 20 times to form sedimentarily an conducting polymer layer on the dielectric layer formed on the surface of pores within the element and on the surface of element. In this alternate dipping repetition, a sequential operation, in which first the capacitor element was dipped in the monomer solution and then pulled up, and after that it was dipped and maintained in the oxidizing agent solution 1 to carry out a polymerization reaction, followed by washing and drying, was repeated.

Figure 5:
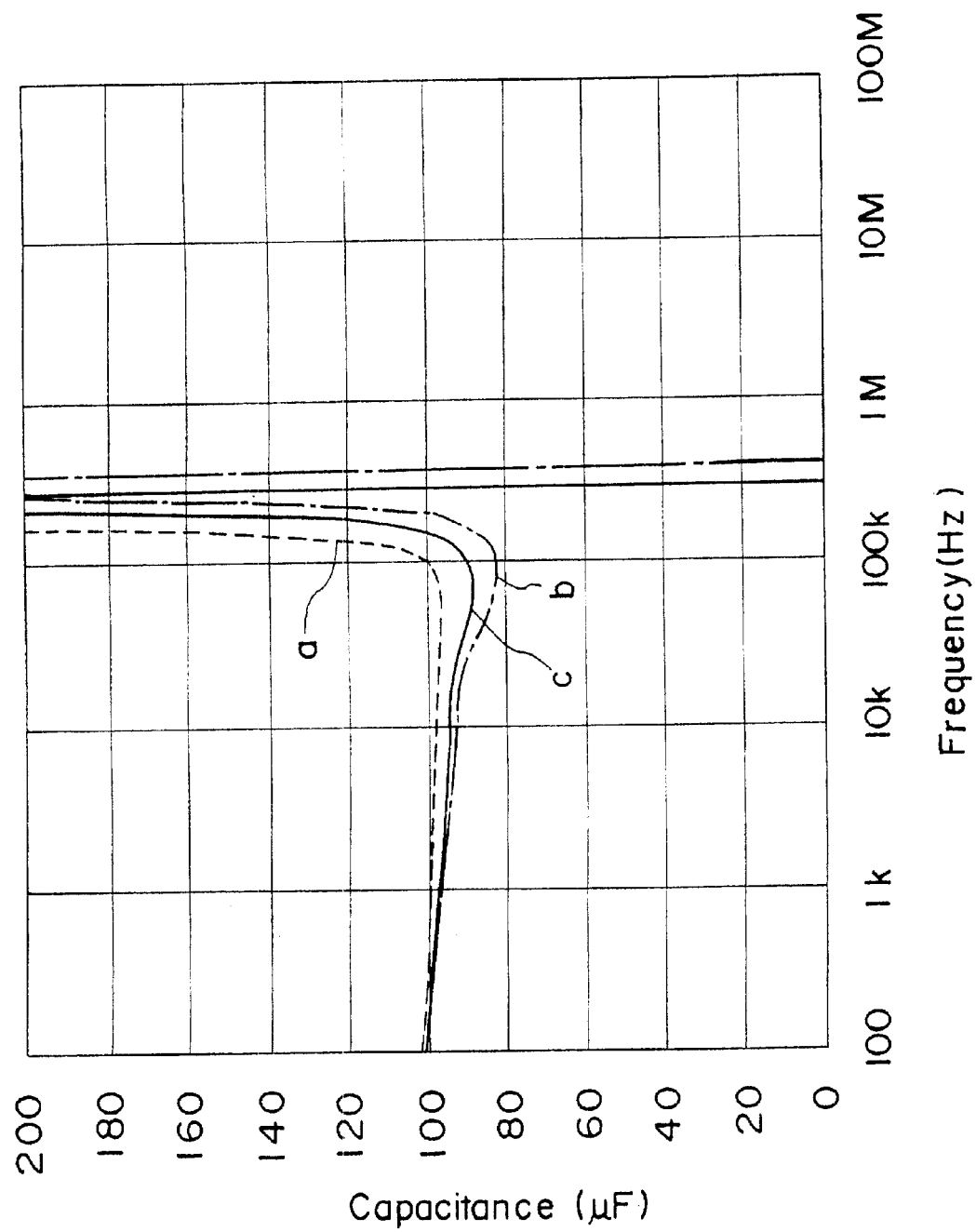
FIG. 5 is a graph showing the high frequency characteristics of the capacitance of an electrolytic capacitor in an example of the present invention.
Figure 6:
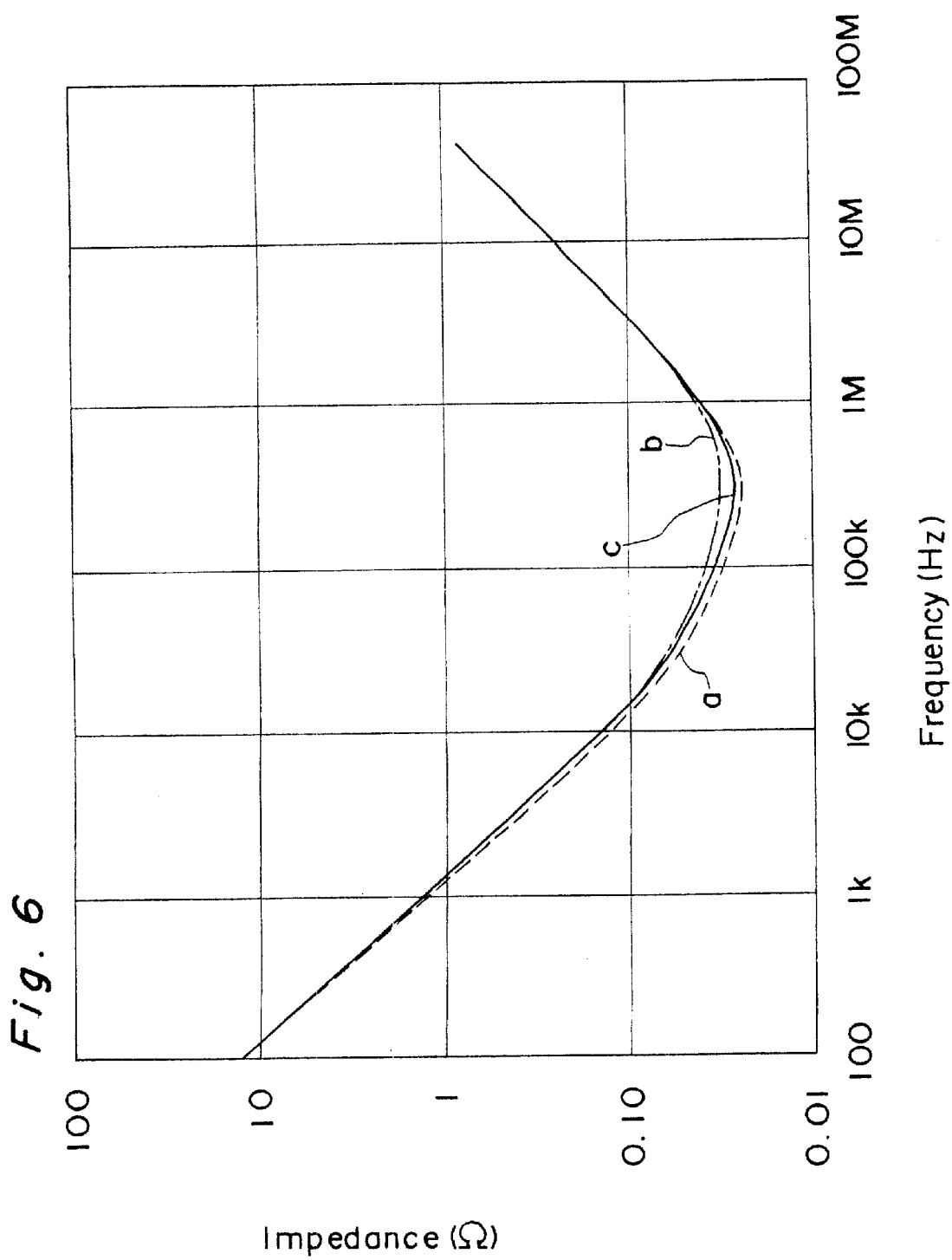
FIG. 6 is a graph showing the high frequency characteristics of the impedance of an electrolytic capacitor in an example of the present invention; and, FIG. 7 is a view showing a glass plate disposed in a monomer solution contained in a container (beaker) used for a test in an example of the present invention.

Various properties of the electrolytic capacitors produced in the above manner are shown in Table 2 and FIGS. 5 and 6.

TABLE 2

| | Film thickness after pretreatment (note) | Capacitance ($\mu$F) | |
| --- | --- | --- | --- |
| | | 120 Hz | 1 kHz |
| Example (1) | (a) 500 nm | 102.4 | 99.6 |
| | (b) 750 nm | 102.5 | 97.2 |
| Comparative Example (2) | (c) 0 nm | 101.1 | 97.6 |

Note:
Thickness of conducting polymer layer undoped

Note: Thickness of conducting polymer layer undoped

It is clear from Table 2 and FIGS. 5 and 6, in the case of forming an conducting polymer layer according to the method (1) according to the present invention, it is confirmed that the capacitor prepared from the product (a) has the excellent characteristics such as low impedance and high responsiveness especially at high frequencies in comparison with a conventional example (c). When the thickness of an conducting polymer layer without containing an organic acid-type dopant is too thick as indicated by the capacitor prepared from the product (b), the film resistance increases and excellent responsiveness at high frequencies more decreases than a conventional example does.

In this example, the thickness of the conducting polymer layer without containing an organic acid-type dopant was 500 nm (average: 100 nm) to examine the influence of the thickness in the pretreatment. It was however confirmed that the characteristics were more improved as the thickness more decreased whereby low impedance could be achieved. As for the limitation to the thickness, even when the thickness was less than the lower detectable limit (10 nm) of a scanning electron microscope and hence was not detected, an excellent effect was confirmed. It was also confirmed that when an conducting polymer layer without containing an organic acid-type dopant was formed in the pretreatment and then the element was dipped and maintained in the dopant solution in the same manner as in Example 1 to carry out doping, the properties were further improved whereby low impedance could be achieved.

This example shows an instance using pyrrole as the monomer. No particular limitations are imposed on the monomer insofar as it is a heterocyclic five-membered ring compound or its derivative. Further, six-membered ring compounds and their derivatives such as polyaniline exhibited the same effect.

Also, though in this example, a Na salt of alkylnaphthalenesulfonic acid is added as the organic acid dopant, other ions, for example, an arylsulfonic acid ion had the same effect and an arylphosphoric acid ion allowed the formation of an conducting polymer layer with higher thermal resistance.

In this example, the conducting polymer layer without containing an organic acid-type dopant is produced by dipping a capacitor element in the solution containing a mixture of an oxidizing agent and a monomer in the pretreatment. The conducting polymer layer without containing an organic acid-type dopant may be produced by repeat dipping operations followed by washing and drying. The same effect can be produced by an alternate dipping operation of the capacitor element in the oxidizing agent solution and in the monomer solution, followed by washing and drying, which may be carried out one time or repeated to form a capacitor. In this case, there is no limitation to the order of dipping operations in the oxidizing agent solution and in the monomer solution.

Also, in this example, the conducting polymer layer containing an organic acid-type dopant is produced by dipping a capacitor element alternately in the oxidizing agent solution and in the monomer solution in the primary treatment. The conducting polymer layer containing an organic acid-type dopant may be formed by a dipping operation of the capacitor element in a solution containing a mixture of the monomer and the oxidizing agent, followed by washing and drying, which may be carried out one time or repeated. The conducting polymer layer may be formed by the two or more repeated operations of dipping the capacitor element alternatively into the oxidizing agent solution and into the monomer solution, followed by washing and drying. There is no limitation to the order of dipping operations in the oxidizing agent solution and in the monomer solution.

This example shows an instance of production of a tantalum electrolytic capacitor. The same procedures can be applied to an aluminum electrolytic capacitor. Furthermore, in the case of producing a capacitor with a structure in which a valvular metal foil is laminated or wound, the valvular metal foil may be laminated or wound after the conducting polymer layer according to the present invention is formed on the valvular metal foil. Alternatively, the conducting polymer layer according to the present invention may be formed after the valvular metal is laminated or wound.

Example 3

A tantalum powder together with a lead was molded and baked to form a porous body with a size of 1.4 mm×3.0 mm×3.8 mm in the same manner as in Example 2. Then, the surface of the body and inner surface of the pores were processed by electrochemical oxidation in an aqueous phosphoric acid solution at a voltage of 30 V to form a dielectric layer thereby producing a capacitor element.

An conducting polymer layer was formed on the dielectric layer of the prepared capacitor element using the chemical oxidation polymerization method illustrated below to form a cathode. A lead plate used as a collector for the cathode was externally disposed to make an electrolytic capacitor. The frequency response of the capacitance of the electrolytic capacitor was measured.

In the formation of an conducting polymer, a monomer solution 1 was produced by dissolving pyrrole and a Na salt with alkylnaphthalenesulfonic acid ion as the organic acid-type dopant in a solution containing 10% by volume of isopropyl alcohol in such a manner that the amounts of pyrrole and Na salt were 0.1 mol/l and 0.05 mol/l, respectively. A monomer solution 2 was produced by dissolving pyrrole in a solution containing 10% by volume of isopropyl alcohol in such a manner that the amount of pyrrole was 0.1 mol/l.

An oxidizing agent solution 1 was produced by dissolving iron sulfate (III) as the oxidizing agent and a Na salt with alkylnaphthalenesulfonic acid ion as the organic acid-type dopant in a solution containing 10% by volume of isopropyl alcohol in such a manner that the amounts of iron sulfate and Na salt were 0.1 mol/l and 0.05 mol/l, respectively. An oxidizing agent solution 2 which did not contain an organic acid-type dopant (but contained a sulfuric acid ion) was produced by dissolving iron sulfate (III) as the oxidizing agent in a solution containing 10% by volume of isopropyl alcohol in such a manner that the amount of iron sulfate was 0.1 mol/l.

(3) First, the above capacitor element was allowed to stand at 60° C. under a relative humidity of 80 to 90% to moisten the capacitor element with water vapor. Then, the monomer solution 2 and the oxidizing agent solution 2 were mixed and the above moistened capacitor element was dipped in the mixed solution to form an conducting polymer layer excluding an organic acid-type dopant on the dielectric layer produced in the inside surface of pores and surface of the capacitor element, followed by washing and drying. The capacitor element was dipped alternately in the monomer solution 1 and in the oxidizing agent solution 1 and this dipping operation was repeated 20 times to grow an conducting polymer layer containing an organic acid-type dopant over the conducting polymer layer excluding an organic acid-type dopant. In the alternate dipping repetition, a sequential operation, in which first the capacitor element was dipped in the monomer solution 1 and then pulled up, and after that it was dipped and maintained in the oxidizing agent solution 1 to carry out a polymerization reaction, followed by washing and drying, was repeated.

(4) The monomer solution 2 and the oxidizing agent solution 2 were mixed and the above capacitor element was dipped in the mixed solution to form an conducting polymer layer excluding an organic acid-type dopant on the dielectric layer produced in the inside surface of pores and surface of the capacitor element, followed by washing and drying. The capacitor element was dipped alternately in the monomer solution 1 and in the oxidizing agent solution 1 and this dipping operation was repeated 20 times to grow an conducting polymer layer containing an organic acid-type dopant over the conducting polymer layer excluding an organic acid-type dopant. In the alternate dipping repetition, a sequential operation, in which first the capacitor element was dipped in the monomer solution 1 and then pulled up, and after that it was dipped and maintained in the oxidizing agent solution 1 to carry out a polymerization reaction, followed by washing and drying, was repeated.

(5) For comparison, a capacitor was produced by the following conventional method: An operation in which the capacitor element was dipped alternately in the monomer solution 1 and in the oxidizing agent solution 1 was repeated 20 times to form sedimentarily an conducting polymer layer on the dielectric layer formed on the surface of pores within the capacitor element and on the surface of the element. In this alternate dipping repetition, a sequential operation, in which first the capacitor element was dipped in the monomer solution 1 and then pulled up, and after that it was dipped and maintained in the oxidizing agent solution 1 to carry out a polymerization reaction, followed by washing and drying, was repeated.

The capacitance of each of the electrolytic capacitors was measured. The results are shown in Table 3.

TABLE 3

| | Capacitance ($\mu$F) | |
|---|---|---|
| | 120 Hz | 1 kHz |
| Example (3) including a moistening process | 110.5 | 108.0 |
| Example (4) general | 102.4 | 99.8 |
| Conventional example (5) | 108.6 | 103.9 |

The capacitor of this conventional example has a capacitance larger than that in Example 2. This is because the organic acid-type dopant which also acts as a surfactant is added to the monomer solution in which the capacitor element is precedently dipped in the alternate dipping operation whereby the conducting polymer is formed on the entire surface extending even deep into pores.

As is clear from Table 3, it is confirmed that the capacitors formed with an conducting polymer layers which are formed by the methods (3) and (4) according to the present invention have excellent responsiveness at high frequencies and the rate of capacitance at 1 kHz/120 Hz higher than those of the capacitor produced by the conventional method (5). Particularly when the moistening treatment using a solvent is performed in advance prior to the pretreatment as indicated by the method (3), it is confirmed that the capacitance at low frequencies is high and capacitor properties are improved at all frequencies since a densified conducting polymer film is formed on the entire surface extending deep into pores.

In this example, the capacitor element was moistened using water vapor prior to the pretreatment. It was also confirmed that the use of alcohol vapor, e.g. ethanol vapor or monomer vapor imparted the same effect according to the method of this example. Besides, vapor of a solvent mixed in the solution used in the pretreatment or solvent having an affinity for the solution, of course, has the same effect.

In this example, the pretreatment was performed using a solution containing a monomer and an oxidizing agent produced by blending the monomer solution and the oxidizing agent solution. It was also confirmed that when the pretreatment was performed by alternate dipping method using solutions respectively containing a monomer and an oxidizing agent, the same effect was imparted by performing the moistening using a vapor of a solvent mixed in the solution used in the precedent dipping operation or solvent having an affinity for the solution.

Furthermore, in this example, the conducting polymer film could be formed on the entire surface extending even deep into pores by moistening the capacitor element prior to the pretreatment. It was confirmed that the same effect could be also obtained by reducing the pressure in the system involving the solution after the capacitor element was dipped.

As illustrated above, according to the present invention in which an conducting polymer layer is formed as a film by a chemical oxidation polymerization method, a densified and homogeneous conducting layer can be produced even extending from the surface of the porous body to the pores formed inside the capacitor element. The present invention can therefore provide an electrolytic capacitor having a high rate of inducing the capacitance, low resistance, and excellent responsiveness at high frequencies.

Also, according to the present invention in which a polymerization reaction of a monomer is carried out in a solution including no organic acid-type dopant in the pretreatment and then a polymerization reaction of a monomer is carried out in a solution containing an organic acid-type dopant, an conducting polymer layer can be formed as a coating layer having a high density and high adhesion to an dielectric layer even by the chemical oxidation polymerization method. As a consequence, an electrolytic capacitor having a high rate of inducing the capacitance, low resistance, and excellent responsiveness at high frequencies can be provided.

This invention being thus described, it will be obvious that the same may be varied in various ways. Such variations are not to be regarded as departure from the spirit and scope of the invention, and all such modifications would be obvious for one skilled in the art intended to be included within the scope of the following claims.

What is claimed is:

1. A method for producing an electrolytic capacitor in which an anode is a valvular metal porous body, a dielectric layer is formed of an oxide of the valvular metal, and a cathode is formed of an conducting polymer layer, the method comprising steps of:

in a pretreatment, forming an conducting polymer layer without including an organic acid-type dopant on the dielectric layer in the porous body by chemical oxidation polymerization of a monomer in a solution; and, in a primary treatment, growing an conducting polymer layer containing an organic acid-type dopant on said conducting polymer layer without containing an organic acid-type dopant by chemical oxidation polymerization of a monomer in a solution containing an organic acid-type dopant.

2. A method according to claim 1, wherein said pretreatment comprises, dipping the valvular metal porous body formed with the dielectric layer in a solution containing a monomer and an oxidizing agent and excluding an organic acid-type dopant to form said conducting polymer layer without including an organic acid-type dopant on the dielectric layer by polymerization reaction.

3. A method according to claim 2, wherein the valvular metal porous body formed with the dielectric layer is dipped in a solution containing the monomer and the oxidizing agent and excluding the organic acid-type dopant, and the valvular metal porous body is subjected to reduced pressure to be impregnated with said solution.

4. A method according to claim 2, wherein the valvular metal porous body formed with the dielectric layer is exposed to a vapor of a solvent of said solution containing the monomer and the oxidizing agent and excluding the organic acid-type dopant or to a vapor of a solvent having an affinity for the solution to moisten the surface of the dielectric layer formed on the valvular metal porous body.

5. A method according to claim 1, wherein said pretreatment comprises steps of dipping said valvular metal porous body provided with the dielectric layer alternately into a monomer solution and into an oxidizing agent solution, the both solutions excluding an organic acid-type dopant, to form an conducting polymer layer without including an organic acid-type dopant on the dielectric layer by polymerizing the monomer.

6. A method according to claim 5, wherein, the valvular metal porous body provided with the dielectric layer is dipped in a solution which is any one of said monomer and oxidizing agent solutions both excluding an organic acid-type dopant, and the valvular metal porous body is subjected to reduced pressure to be impregnated with said solution.

7. A method according to claim 5, wherein the valvular metal porous body provided with the dielectric layer is exposed to a vapor of a solvent of a solution to be first dipped in, said solution being any one of said monomer and oxidizing agent solutions both excluding the organic acid-type dopant, or to a vapor of a solvent having an affinity for the solution to moisten the surface of the dielectric layer formed on the valvular metal porous body.

8. A method according to any one of claims 1 to 7, wherein said pretreatment comprises a plurally repetitive operation in which said conducting polymer layer without including an organic acid-type dopant is repetitively formed by polymerization.

9. A method according to claim 8, wherein said conducting polymer layer without including an organic acid-type dopant is doped with an organic acid-type dopant by dipping said conducting polymer layer of the porous body into the solution containing said organic acid-type dopant after the pretreatment, and then the conducting polymer layer containing the organic acid-type dopant is formed on the resulting conducting polymer layer doped with the organic acid-type dopant in the primary treatment.

10. A method according to claim 9, wherein said solution containing the organic acid-type dopant used in doping with the organic acid-type dopant is a solution produced by dissolving the organic acid-type dopant in a solvent capable of swelling the conducting polymer layer which does not contain the organic acid-type dopant.

11. A method according any one of claims 1 to 7, wherein the film thickness of said conducting polymer layer without including the organic acid-type dopant which is formed in the pretreatment is greater than that of one molecular layer and less than 500 nm.

12. A method according to claim 11, wherein said conducting polymer layer without including an organic acid-type dopant is doped with an organic acid-type dopant by dipping said conducting polymer layer of the porous body into the solution containing said organic acid-type dopant after the pretreatment, and then the conducting polymer layer containing the organic acid-type dopant is formed on the resulting conducting polymer layer doped with the organic acid-type dopant in the primary treatment.

13. A method according to claim 12, wherein said solution containing the organic acid-type dopant used in doping with the organic acid-type dopant is a solution produced by dissolving the organic acid-type dopant in a solvent capable of swelling the conducting polymer layer which does not contain the organic acid-type dopant.

14. A method according to any one of claims 1 to 7, wherein said conducting polymer layer without including an organic acid-type dopant is doped with an organic acid-type dopant by dipping said conducting polymer layer of the porous body into a solution containing said organic acid-type dopant after the pretreatment, and then the conducting polymer layer containing the organic acid-type dopant is formed on the resulting conducting polymer layer doped with the organic acid-type dopant in the primary treatment.

15. A method according to claim 14, wherein said solution containing the organic acid-type dopant used in doping with the organic acid-type dopant is a solution produced by dissolving the organic acid-type dopant in a solvent capable of swelling the conducting layer which does not contain the organic acid-type dopant.

16. A method according to claim 1, wherein said primary treatment comprises steps of;

dipping said pretreated valvular metal porous body in a solution containing a mixture of a monomer, an oxidizing agent, and an organic acid-type dopant to form an conducting polymer layer containing the organic acid-type dopant on said conducting polymer layer without containing an organic acid-type dopant by polymerization of the monomer.

17. A method according to claim 1, wherein said primary treatment comprises dipping said pretreated valvular metal porous body alternately in a monomer solution and an oxidizing agent solution, either of the two solutions including an organic acid-type dopant, to form an conducting polymer layer containing said organic acid-type dopant on said conducting polymer layer excluding the organic acid-type dopant by a polymerization reaction.

18. A method according to claim 16 or 17, wherein said primary treatment comprises a plurality of the operations in which the formation of said conducting polymer layer containing the organic acid-type dopant by polymerization are repeated.

19. A method according to claim 1, wherein said monomer is a heterocyclic five-membered compound or its derivative.

20. A method for producing an electrolytic capacitor according to claim 1, wherein said organic acid-type dopant is an arylsulfonic acid ion or an arylphosphoric acid ion.

21. A method for producing an electrolytic capacitor according to claim 1, wherein said valvular metal is aluminum or tantalum.

* * * * *